United States Patent [19]

Chikuma et al.

[11] Patent Number: 5,048,852
[45] Date of Patent: Sep. 17, 1991

[54] FOUR-WHEEL STEERING APPARATUS

[75] Inventors: Isamu Chikuma; Satoru Shimada; Hiroshi Eda, all of Maebashi, Japan

[73] Assignee: Nippon Seiko Kabushiki Kaisha, Tokyo, Japan

[21] Appl. No.: 433,915

[22] Filed: Nov. 9, 1989

[30] Foreign Application Priority Data

Mar. 10, 1989 [JP] Japan ................................. 1-56299
Mar. 13, 1989 [JP] Japan ................................. 1-57808

[51] Int. Cl.$^5$ ............................................. B62D 5/00
[52] U.S. Cl. ..................................... 280/91; 180/140; 180/145; 180/79.1
[58] Field of Search ............... 280/91; 180/79.1, 140, 180/145, 79.3, 79

[56] References Cited

U.S. PATENT DOCUMENTS

| 4,163,566 | 8/1979 | Tapp | 280/91 |
| 4,286,798 | 9/1981 | Butler et al. | 280/91 |
| 4,589,510 | 5/1986 | Düerwald et al. | 280/91 |
| 4,874,183 | 10/1989 | Chikuma et al. | 280/91 |
| 4,878,556 | 11/1989 | Wells | 280/91 |

FOREIGN PATENT DOCUMENTS

| 0235169 | 8/1988 | Japan | 280/91 |
| 0032974 | 2/1989 | Japan | 280/91 |
| 1-153380 | 6/1989 | Japan . | |
| 1-223076 | 9/1989 | Japan . | |
| 2222990 | 3/1990 | United Kingdom | 280/91 |

Primary Examiner—Charles A. Marmor
Assistant Examiner—Mitchell Bompey
Attorney, Agent, or Firm—Shapiro and Shapiro

[57] ABSTRACT

A four-wheel steering apparatus comprises a front wheel steering member for steering front wheels by being displaced according to a movement of a steering wheel, a rear wheel steering mechanism for steering rear wheels, a coupling mechanism for mechanically coupling together the front wheel steering member and an input member of the rear wheel steering mechanism, and a play mechanism provided between an end of the coupling mechanism and the front wheel steering member or the input member or in an intermediate part of the coupling mechanism, the play mechanism effecting transmission of displacement only when a displacement in excess of a predetermined amount is produced in either direction from a position corresponding to a neutral position with respect to the steering angle of the front wheels. The rear wheel steering mechanism includes a mechanism for steering the rear wheels according to a movement of the input member and an independent steering mechanism for steering the rear wheels independently of displacement of the front wheel steering member.

30 Claims, 4 Drawing Sheets

FOUR-WHEEL STEERING APPARATUS

BACKGROUND OF THE INVENTION

1. Field of the Invention

This invention relates to a four-wheel steering apparatus utilized as vehicle-steering means to change the angle of rear wheels as well as front wheels for changing the direction of running of the vehicle, thus permitting reduction of the turning radius of the vehicle and also ensuring the running stability or safety thereof.

2. Related Background Art

Recently, four-wheel steering apparatus for steering not only front wheels but also rear wheels in response to the operation of a steering wheel has become in use to reduce the turning radius of the vehicle so as to be able to readily change the running direction on a narrow road or ensure safety of the vehicle when changing the running direction while the vehicle runs at a high speed.

As the prior art four-wheel steering apparatus, usually there are following four types (a) to (d).

(a) A front wheel steering unit and a rear wheel steering unit are mechanically coupled to each other such that the rear wheels are steered in a fixed relation to the steering of the front wheels.

(b) A front wheel steering unit and a rear wheel steering unit are coupled to each other by hydraulic circuit to let the rear wheels be steered in a fixed relation to the steering of the front wheels.

(c) A front wheel steering unit and a rear wheel steering unit are coupled to each other by a hydraulic mechanism, but the rear wheels and front wheels can be steered independently.

(d) A front wheel steering unit and a rear wheel steering unit are coupled to each other only electrically, and the rear wheels can be steered independently of the front wheels.

Of these four different types of steering apparatus, either type (a) or (b) is adopted when it is necessary to provide a large steering angle to the rear wheels for reducing the turning radius of the vehicle, and either type (c) or (d) is usually adopted when it is not necessary to provide a large steering angle to the rear wheels.

In the four-wheel steering apparatus of either type (c) and (d), in which the rear wheels can be controlled independently of the front wheels, there is hazardousness when the rear wheels are steered greatly while the vehicle is running at a high speed. The four-wheel steering apparatus of either type (a) or (b) is free from such hazardousness because the front and rear wheels are steered in an interlocked relation to one another in response to the driver's action.

However, the prior art four-wheel steering apparatus of either type (a) and (b), can not sufficiently improve the safety during high speed running because the front and rear wheels are steered only in an interlocked relation to one another in response to the driver's action.

More specifically, in the steering system in which the front and rear wheels are steered in an interlocked relation to one another, when giving a small steering angle to the front wheels the same phase is provided to the front and rear wheels (i.e., the front and rear wheels are turned in the same direction) for a stable lane change or the like during high speed driving, while when giving a large steering angle to the front wheels opposite phases are provided to the front and rear wheels (i.e., the front and rear wheels are turned in opposite directions) for reducing the turning radius of the vehicle and thus facilitating the garaging of the vehicle or the like. However, the apparatus may fail to ensure sufficient stability of the vehicle (although it can ensure far superior safety as compared with the case of the prior art two-wheel steering apparatus) in case when there occurs an unexpected situation during high speed driving.

For example, during high speed driving the vehicle may experience sidewise winds, the rear wheels may slip in a transverse direction at the time of high speed cornering, or sudden steering (i.e., quick handling) may be required by an unexpected occurrence such as someone or something coming into the vehicle's path. In such cases, the stability of the vehicle can be ensured if the rear wheels can be steered at a small amount. However, in this case, the rear wheels must be steered independently of the front wheels. With the apparatus of either type (a) or (b), such measure can not be effected because the rear wheels can not be steered independently of the front wheels.

While the four-wheel steering apparatus of either type (c) or (d) can provide such measure, it can not provide a considerably large steering angle to the rear wheels in view of the safety and hence can not permit considerable reduction of the turning radius of the vehicle, as noted before.

SUMMARY OF THE INVENTION

The four-wheel steering apparatus according to the invention seeks to overcome the above drawbacks by permitting increase of the steering angle of the rear wheels to be effected only in a relation to the steering angle of the front wheels and also permitting a reduction of the steering angle of the rear wheels independently of the steering of the front wheels.

More specifically, the invention has an object of providing a four-wheel steering apparatus, which permits increase of the steering angle of the rear wheels to be effected only in a relation to the steering of the front wheels while permitting a reduction of the steering angle of the rear wheels to be effected independently of the steering of the front wheels, thus permitting reduction of the turning radius of the vehicle while ensuring safety and also permitting delicate steering of the rear wheels to ensure stability of the vehicle when an unexpected external disturbance is encountered during high speed running.

Another object of the invention is to provide a four-wheel steering apparatus, which comprises a front wheel steering member for steering front wheels by being displaced according to a movement of a steering wheel, a rear wheel steering mechanism for steering rear wheels, a coupling mechanism for mechanically coupling together the front wheel steering member and an input member of the rear wheel steering mechanism, and a play mechanism provided between an end of the coupling mechanism and the front wheel steering member or the input member or in an intermediate part of the coupling mechanism, the play mechanism effecting transmission of displacement only when a displacement in excess of a predetermined amount is produced in either direction from a position corresponding to a neutral position with respect to the steering angle of the front wheels, the rear wheels steering mechanism including a mechanism for steering the rear wheels according to a movement of the input member and an independent steering mechanism for steering the rear wheels independently of displacement of the front wheel steering member.

The four-wheel steering apparatus according to the invention is provided with a coupling mechanism for mechanically coupling together a front wheel steering member for steering the front wheels by being displaced according to the movement of the steering wheel, and the input member of the rear wheel steering mechanism for steering the rear wheels.

Further, the play mechanism is provided between an end of the coupling mechanism and the front wheel steering member or the input member or in an intermediate part of the coupling mechanism, for effecting transmission of displacement when and only when a displacement in excess of a predetermined amount is produced in either direction from a position corresponding to a neutral position with respect to the steering angle of the front wheels.

Further, the rear wheel steering mechanism includes the independent mechanism for steering the rear wheels independently of displacement of the front wheel steering member.

With the above construction of the four-wheel steering apparatus according to the invention, when the steering wheel is turned greatly during low speed running, the front wheel steering member is displaced beyond a predetermined amount, so that the input member of the rear wheel steering mechanism is displaced (to an amount less than the displacement of the front wheel steering member by the predetermined amount noted above) in spite of the presence of the play mechanism, thus providing a sufficiently large steering angle to the rear wheels according to the steering of the front wheels.

On the other hand, when it becomes necessary to -secure stability of the vehicle such as when a sudden steering operation is made during high speed running, the independent steering mechanism in the rear wheel steering mechanism subtly steers the rear wheels to secure safety of the vehicle.

BRIEF DESCRIPTION OF THE DRAWINGS

FIGS. 1 to 5 illustrate a first embodiment of the invention, in which:

FIGS. 6 to 8 illustrate a second embodiment of the invention, in which:

DETAILED DESCRIPTION OF THE PREFERRED EMBODIMENTS

Preferred embodiments of the invention will now be described in detail with reference to the drawings.

Figure 1:
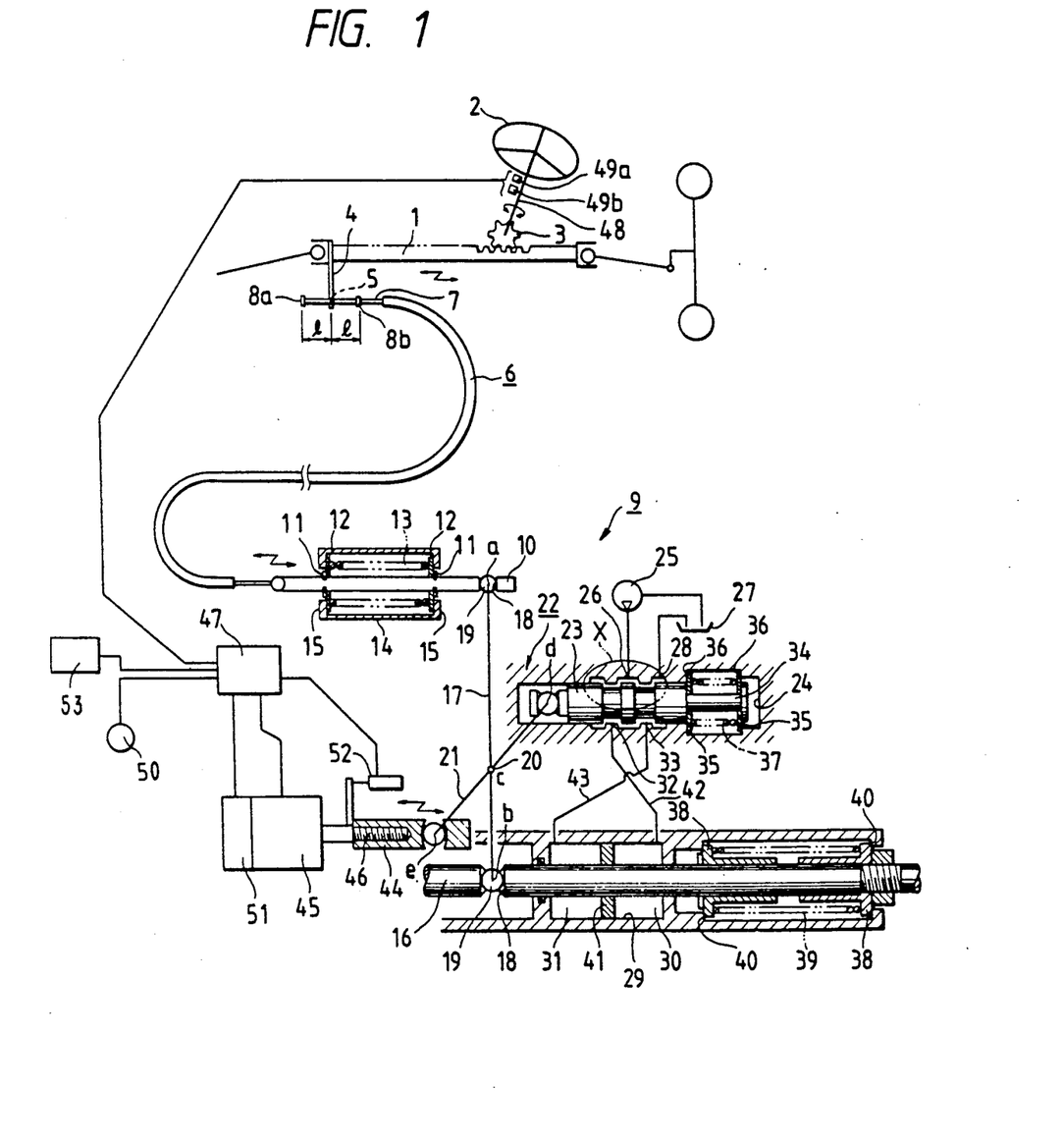
FIG. 1 is a schematic view showing the overall apparatus.
Figure 2:
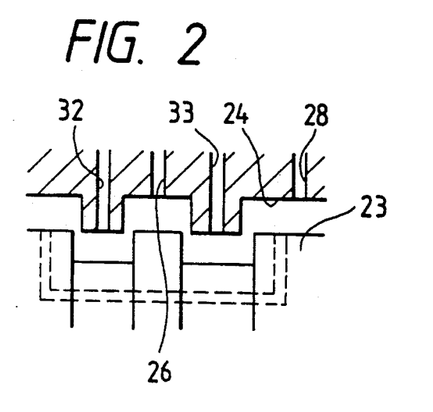
FIGS. 2 and 3 are enlarged-scale fragmentary sectional views of portion X in FIG. 1 showing hydraulic change-over valve in a neutral state and a switched state, respectively.
Figure 3:
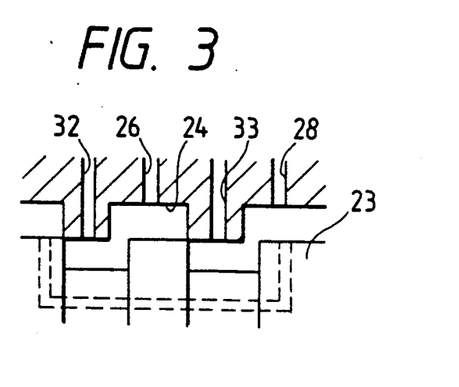
Figure 4:
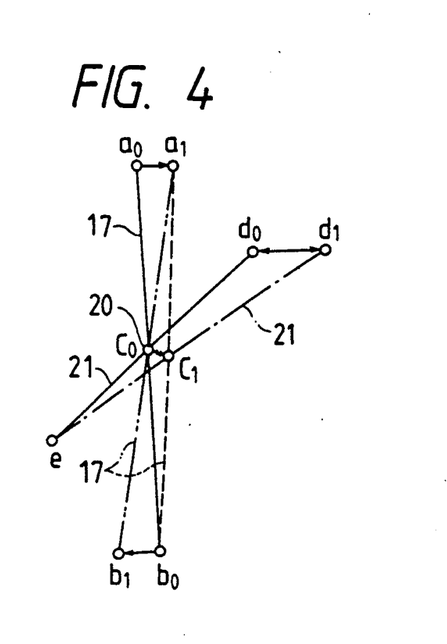
FIGS. 4 and 5 are schematic views showing movement of various parts when steering front and rear wheels in an interlocked relation to one another and when steering the rear wheels independently of the front wheels, respectively.
Figure 5:
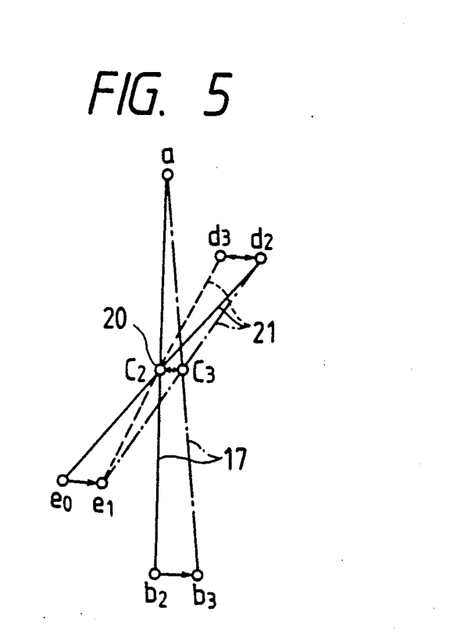

FIGS. 1 to 5 illustrate a first embodiment of the invention. FIG. 1 is a schematic sectional view showing the overall apparatus, FIGS. 2 and 3 are enlarged-scale fragmentary sectional views of portion X in FIG. 1 showing hydraulic change-over valve in a neutral state and a switched state, respectively, and FIGS. 4 and 5 are schematic views showing movement of various parts when steering front and rear wheels in an interlocked relation to one another and when steering the rear wheels independently of the front wheels, respectively.

Referring to FIG. 1, a rack 1 as front wheel steering member is meshing with a pinion 3 rotated by a steering wheel 2. By operating steering wheel 2, the rack 1 is displaced to the left and right directions in FIG. 1 to give a steering angle to the front wheels. The rack 1 pivotably supports the front wheels at both ends thereof.

An arm 4 is secured to an end of the rack 1, and it has a through hole 5 formed adjacent to its free end. An end portion of a wire 7 constituting a Bowden cable 6 loosely penetrates the hole 5. A pair of stoppers 8a and 8b are secured in a spaced-apart relation to each other to the aforementioned end portion of wire 7. The movement of the rack 1 is transmitted to wire 7 only when the arm 4 engages with either stopper 8a or 8b.

In neutral state of the steering wheel 2 (i.e., while the vehicle is running straight), the arm 4 is located midway between the stoppers 8a and 8b, providing a play of length l between the arm and each of the stoppers 8a and 8b. Therefore, while the displacement amount h of the rack 1 is less than the play noted above (i.e., l>h), it is not transmitted to the wire 7, but when it exceeds the play, (l<h), it is transmitted to the wire 7.

The other end of the wire 7 is coupled to one end i.e., left end in FIG. 1) of an input rod 10 of a rear wheel steering mechanism 9. A pair of stopper rings 11 are provided in a spaced-apart relation to each other on an intermediate portion of the input rod 10. A pair of spring retainer rings 12 are provided on opposed sides of the stopper rings 11 and a compression spring 13 is provided between the rings 12 to support inner peripheries of the spring retainer rings 12. Respective outer peripheries of the spring retainer rings 12 face inner flanges 15 of a casing 14 formed with opposite open ends. The casing 14 is mounted on a substrate for supporting the rear wheel steering mechanism 9. The input rod 10 thus is held at its neutral position as illustrated unless external force is exerted (i.e., unless the wire 7 is pushed or pulled).

An output rod 16 constitutes together with the input side rod 10 the rear wheel steering mechanism 9. It can be displaced in the axial direction (i.e, to the left and right directions in FIG. 1) to steer the rear wheels. The input and the output rods 10 and 16 extend substantially parallel to each other. However, if necessary, either one of these rods (i.e., either rod 10 or 16) is slightly pivotably supported on a vehicle body so that it is capable of displacement relative to a first coupling rod 17 to be described later. Neither rod 10 nor 16 need be pivotably supported on the vehicle body if the first coupling rod 17 has sufficient rigidity and is also capable of slightly telescoping and or if pivotal sections a and b a respective between each end of the first coupling rod 17 and one of the rods 10 and 16 are made capable, by engagement between holes 18 and rollers 19, of slight displacement in the axial direction of the first coupling rod 17.

A second coupling rod 21 has its intermediate portion coupled through a pivotal member 20 to an intermediate portion of the first coupling rod 17 which has its opposite ends pivotably coupled to the input and output rods 10 and 16 as noted above. The second coupling rod 21 has one end pivotably coupled to an end of a spool 23 of a hydraulic change-over valve 22.

The spool 23 of the hydraulic change-over valve 22 is accommodated for axial displacement in a cylinder 24. The cylinder 24 has a supply port 26 communicated with a discharge port of a hydraulic pump 25, a discharge port 28 communicated with an oil tank 27 and first and second control ports 32 and 33 communicated with respective first and second chambers 30 and 31 of a hydraulic cylinder 29 to be described later. Communication of the supply and discharge ports 26 and 28 with the first and second ports 32 and 33 can be switched according to axial displacement of the spool 23.

The spool 23 has an extension rod 34 extending from one end. Stopper rings 35 are fitted on a stem and a free end, respectively, of the extension rod 34. Outer peripheries of the stopper rings 35 face respective shoulder surfaces 36 formed on the inner periphery of the cylinder 24. A compression spring 37 is provided between the stopper rings 35. In the absence of any external force applied to it, the spool 23 is retained at its neutral portion as shown in FIG. 2. In this state, supply and discharge ports 26 and 28 are directly communicated with each other, and no pressurized oil is supplied to or discharged from any of the chambers 30 and 31 in the hydraulic cylinder 29.

Like stopper rings 38 and a compression spring 39 are provided on an intermediate portion of output rod 16, with outer peripheries of the stopper rings 38 facing shoulder surfaces 40 formed on the inner periphery of the hydraulic cylinder 29. Thus, in the absence of external force applied to it, the output rod 16 is retained at its neutral position, and no steering angle is given to the rear wheels.

The output rod 16 is surrounded by the hydraulic cylinder 29. A piston 41 is secured to the outer periphery of an intermediate portion of the output rod 16 and is fitted fluid-tight and axially movably into the hydraulic cylinder 29.

The first and second chambers 30 and 31 in the hydraulic cylinder 29, located on the opposite sides of piston 41, are connected with respective first and second ports 32 and 33 of the hydraulic change-over valve 22 by first and second oil paths 42 and 43.

The second coupling rod 21 which is pivotably coupled at one end thereof to one end of the spool 23 of the hydraulic change-over valve 22 and having an intermediate portion coupled via a pivotal member 20 to an intermediate portion of the first coupling rod 17, is capable, if necessary, of slightly telescoping for the same reasons as in the case of first coupling rod 17. A nut 44 is pivotably attached to the other end of the second coupling rod 21. The nut 44 is meshed with a male thread 46 formed on the outer periphery of the output shaft of a stepping servo motor 45 which is mounted on a stationary part of the vehicle body. Thus, with the rotation of the stepping servo motor 45 the second coupling rod 21 is pivotable about the pivotal member 20 to cause the spool 23 to displace in the axial direction.

The stepping servo motor 45 is rotated in a proper direction by a proper angle (number of rotations) according to a command signal from a controller 47. Controller 47 includes a microcomputer, and for detecting the rotational angle and angular speed of steering wheel 2 it receives signals from two steering angle sensors 49a and 49b provided in the neighborhood of handle shaft 48, a vehicle speed sensor 50 for detecting the vehicle speed and means 53 including various other sensors for detecting at least one of items selected from those having influence on the running of the vehicle, for instance the magnitude of reaction force generated in the front wheel steering unit, acceleration (G) applied sidewise to the vehicle body and stress applied thereto due to sidewise winds or running along a slope.

The controller 47 causes the stepping servo motor 45 to rotate in a proper direction and by a proper angle (i.e., number of rotations) according to the running state of the vehicle, which is determined from the signals supplied from the sensors noted above. With the rotation of the stepping servo motor 45, the nut 44 meshing with the male thread 46 is axially displaced to cause the second coupling rod 21 to be pivoted at one end of the nut 44 about the pivotal member 20. As a result, the second coupling rod 21 causes an axial displacement of the spool 23.

The motion of the stepping servo motor 45 as above is detected by a rotational angle sensor 51, which directly detects the rotational angle of the stepping servo motor 45, and a displacement sensor 52, which detects the axial displacement of the nut 44. The signals from both sensors 51 and 52 are supplied to the controller 47.

The provision of two steering angle sensors 49a and 49b and also the provision of rotational angle and displacement sensors 51 and 52 for detecting the operation of the stepping servo motor 45 are made providing a fail-safe function to ensure reliable control even if there is a trouble in either one of the two groups of sensors.

The function or operation of the four-wheel steering apparatus having the construction as described according to the invention will now be described in connection with the steering of the vehicle.

First, a case is considered, in which the front and rear wheels are steering in an opposite directions to one another such as in the case of steering the rear wheels in the opposite direction to the front wheels to reduce the turning radius of the vehicle during low speed running.

While the rotational angle of the steering wheel 2 is small, the arm 4 provided at the end of the rack 1 strikes neither stopper 8a nor 8b, and the wire 7 is neither pushed nor pulled. When the steering wheel 2 is rotated greatly to change the running direction of the vehicle so that the displacement of the rack 1 is increased, the arm 4 strikes either stopper 8a or 8b to push or pull the wire 7.

As a result, the input rod 10 of the rear wheel steering mechanism 9 is displaced an amount l less than the displacement amount of the rack 1.

With this displacement of the input rod 10 in the axial direction with operation of the steering wheel 2, a pivotal section a between the input rod 10 and one end of the first coupling rod 17 is displaced from a position $a_0$ to position $a_1$ in FIG. 4, whereupon the first coupling rod 17 pivots about a pivotal section b between it and the output rod 16. Thus, the first coupling rod 17, which has been in the state shown by a solid line in FIG. 4, is displaced to the state as shown by a dashed line. With this displacement the pivotal member 20, which couples together the intermediate portions of the first and second coupling rods 17 and 21, is displaced from position $c_0$ to $c_1$ in FIG. 4.

With this displacement, a pivotal section d between the second coupling rod 21 and spool 23 is displaced from position $d_0$ to $d_1$ as shown in FIG. 4. Thus, the relation between the spool 23 and the cylinder 24 is changed from the state shown in FIG. 2 to that shown in FIG. 3. That is, the ports 26, 28, 32 and 33 of the hydraulic change-over valve 22 are switched to communicate the supply port 26 with the first port 32 (or the second port 33) and also communicate the discharge port 28 with the second port 33 (or the first port 32). The hydraulic pressurized oil is supplied through the first (or the second) hydraulic path 42 (or 43) to the first (or the second) chamber 30 (or 31) of the hydraulic cylinder 29 and discharged from the second (or the first) chamber 31 (or 30) through the second (or the first) hydraulic path 43 (or 42). It will be noted that at the moment of switching of the hydraulic change-over valve 22 the output rod 16 has not yet been displaced, and the pivotal section b between the first coupling rod 17 and the output rod 16 is found at position $b_0$ in FIG. 4.

As described above, when ports 26, 28, 32 and 33 of the hydraulic change-over valve 22 are switched in accordance with displacement of the spool 23 for supplying and discharging oil to and from the hydraulic cylinder 29 through the first and second hydraulic paths 42 and 43 in the above-mentioned way, the output rod 16 is axially displaced via the piston 41 fitted in the hydraulic cylinder 29, thus effecting the steering of the rear wheels.

With the displacement of the output rod 16, the pivotal section b between the first coupling rod 17 and the output rod 16 is displaced from the position $b_0$ to the position $b_1$ in FIG. 4. Thus, the first coupling rod 17 is brought to the state shown by a phantom line, and the pivotal member 20 coupling together the intermediate portions of the first and second coupling rods 17 and 21 is displaced or returned from position $c_1$ to position $c_0$ in FIG. 4. Accordingly, the displacement of the pivotal member 20, which couples together the intermediate portion of the first coupling rod 17 and the intermediate portion of the second coupling rod 21 having one end pivotably coupled to the spool 23, return to zero.

This displacement correction, i.e., the operation of movement of the pivotal member 20 from the position $c_0$ to the position $c_1$ and then back to the position $c_0$ is effected momentarily with axial displacement of the input and output rods 10 and 16. Therefore, the displacement of the input rod 10 is effectively transmitted directly to the output rod 16 as if the first coupling rod 17 were rotated about the pivotal member 20 fixed at the position $c_0$ from the state shown by the solid line in FIG. 4 to the state shown by the phantom line, and the rear wheels are steered in accordance with the steering of the front wheels.

Accordingly since a sufficiently large angle can be given to the rear wheels even if safety is taken into consideration, the turning radius of the vehicle can be sufficiently reduced. Further, since this embodiment utilizes the Bowden cable 6 as a mechanical coupling mechanism for transmitting movement of the front wheels to the rear wheels, the mechanism for mechanically coupling the rack 1 for steering the front wheels and the input rod 10 of the rear wheel steering mechanism 9 can be disposed substantially freely, thus increasing the degree of freedom of design. The Bowden cable 6 transmits only displacement amount data between the rack 1 and the input rod 10 and never transmits steering force. Therefore, it need not have particularly high rigidity.

Now, a case of steering the rear wheels independently of the front wheels will be considered. In this case, controller 47 supplies a signal to the stepping servo motor 45 according to signals from sensors (not shown) for detecting the vehicle state and also steering state signals from the steering angle sensors 49a and 49b. As a result, the stepping servo motor 45 causes displacement of a pivotal section e between the nut 44 and one end of the second coupling rod 21 from a position $e_0$ to a position $e_1$ in FIG. 5 via the male thread 46 and the nut 44. At this time, the second coupling rod 21 is rotated about the pivotal member 20 from the state shown by the solid line in FIG. 5 to the state shown by the dashed line, thus causing displacement of pivotal section d between the other end of second coupling rod 21 and the spool 23 from the position $d_2$ to the position $d_3$. This time, the spool 23 of the hydraulic change-over valve 22 is displaced in a proper direction by a proper distance according to the direction and magnitude of external disturbance detected by sensors.

With this displacement of spool 23, the ports 26, 28, 32 and 33 of the hydraulic change-over valve 22 are switched to supply and discharge the pressurized oil to and from the hydraulic cylinder 29 through the first and second hydraulic paths 42 and 43, the output rod 16 thus being displaced in the axial direction via piston 41.

As a result, the pivotal section b between the output rod 16 and the first coupling rod 17, which has been at the position $b_2$ in FIG. 5, is displaced to the position $b_3$, thus permitting subsequent steering of the rear wheels irrespective of any displacement of the input rod 10 and hence independently of the front wheels.

When the output rod 16 is axially displaced to an amount necessary and sufficient for appropriate steering of the rear wheels, pivotal member 20, coupling the intermediate portions of the first and second coupling rods 17 and 21 together, is displaced from position $c_2$ to the position $c_3$ in FIG. 5. Then the second coupling rod 21 is rotated about the position $e_1$ from the position shown by dashed line to the position shown by phantom line to effect displacement of pivotal section d between the other end of the second coupling rod 21 and the spool 23 from the position $d_3$ to the position $d_2$. Thus, the positional relation between spool 23 and the cylinder 24, which has been as shown in FIG. 3 (actually the spool 23 being switched to opposite direction with movement of various components toward positions as shown in FIG. 5) is brought to the neutral state shown in FIG. 2. As a result, the supply and discharge of fluid to and from the hydraulic cylinder 29 are stopped, and the output rod 16 is no further displaced, thus setting the steering angle of the rear wheels. When the external disturbance is over, the steering angle of the rear wheels is reduced to zero by the converse sequence of operations to that described above.

Since the spool 23 is displaced to a small amount by the stepping servo motor 45, there is no possibility of a large steering angle to the rear wheels, irrespective of the motion of steering wheel even if a trouble occurs.

Figure 6:
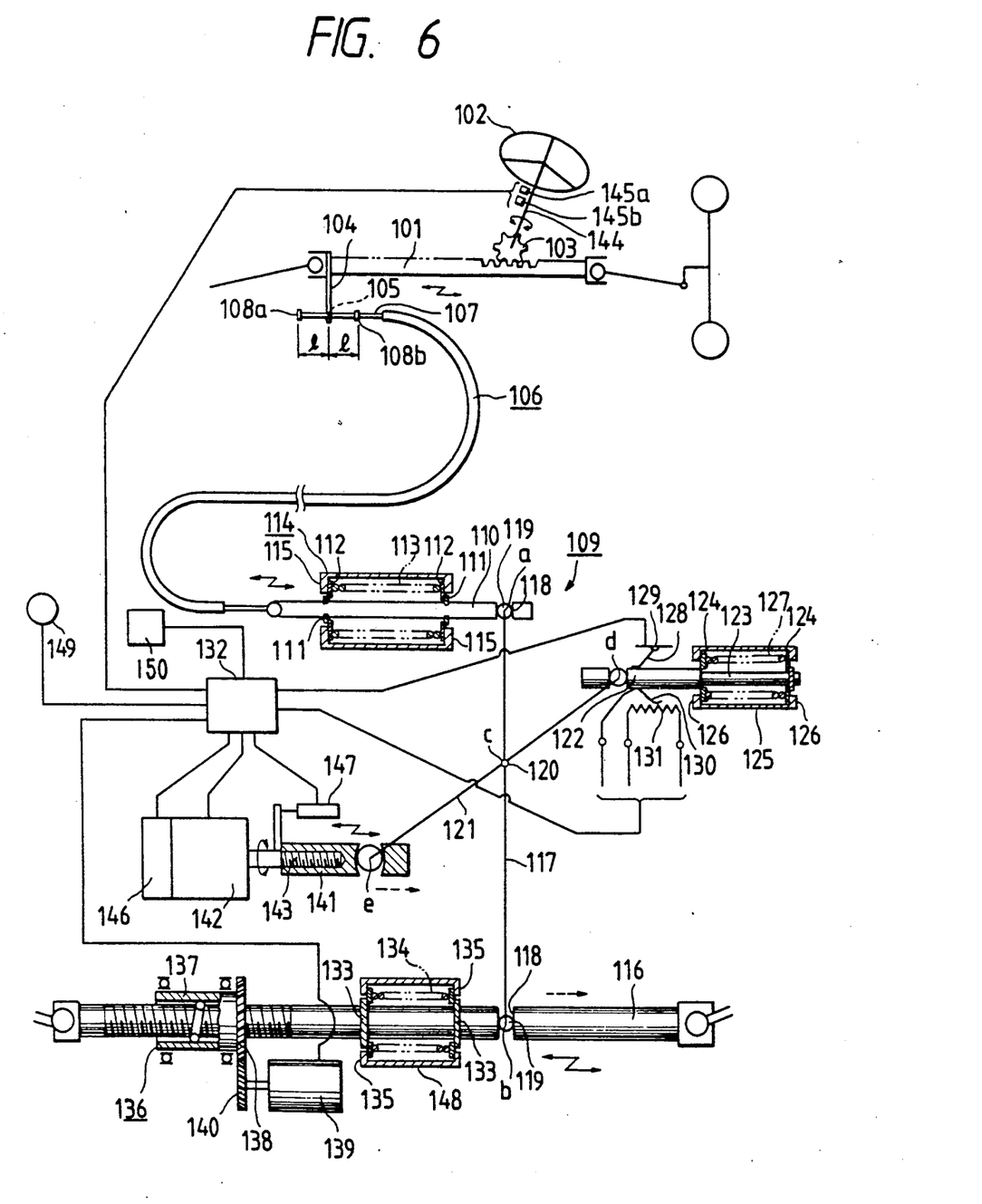
FIG. 6 is a schematic sectional view showing the overall apparatus.
Figure 7:
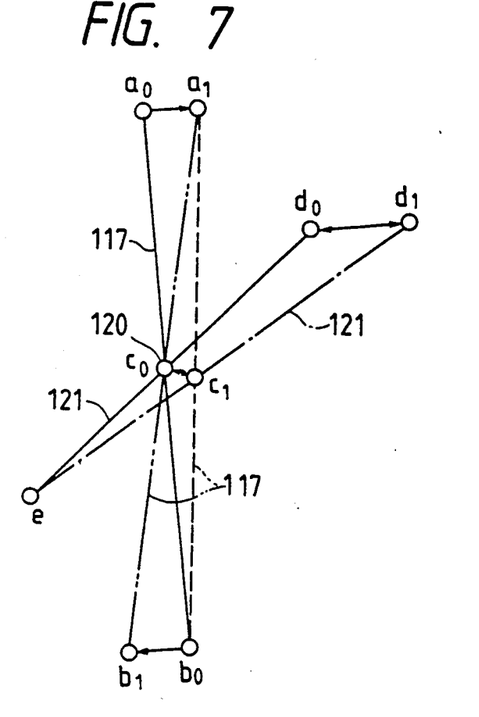
FIGS. 7 and 8 are schematic views showing movement of various parts when steering front and rear wheels in an interlocked relation to one another and when steering the rear wheels independently of the front wheels, respectively.
Figure 8:
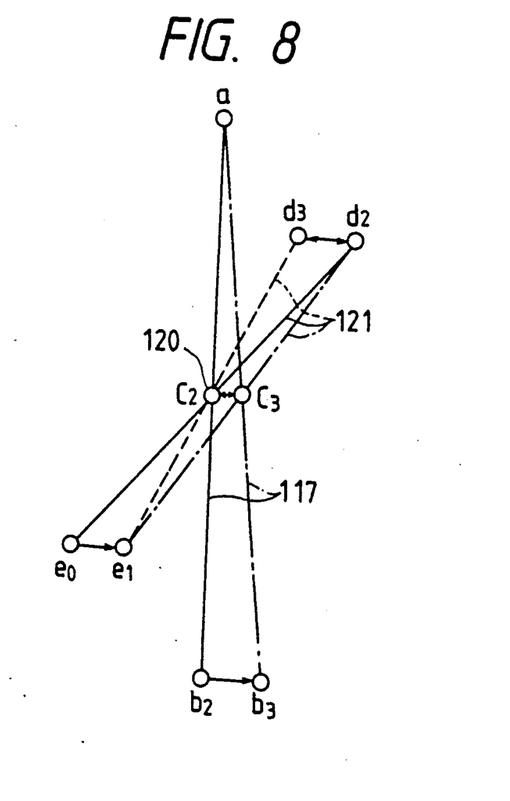

FIGS. 6 to 8 illustrate a second embodiment of the invention. FIG. 6 is a schematic sectional view showing the overall apparatus, and FIGS. 7 and 8 are schematic views showing movement of various parts when steering front and rear wheels in an interlocked relation to one another and when steering the rear wheels independently of the front wheels, respectively.

Referring to FIGS. 6, a rack 101 as front wheel steering member is meshing with a pinion 103 rotated by a steering wheel 102. By operating the steering wheel 102, the rack 101 is displaced to the left and right directions in FIG. 6 to give a steering angle to the front wheels.

An arm 104 is secured to an end of the rack 101, and it has a through hole 105 formed adjacent to its free end. An end portion of a wire 107 constituting a Bowden cable 106 loosely penetrates the hole 105. A pair of stoppers 108a and 108b are secured in a spaced-apart relation to each other to the afore-mentioned end portion of the wire 107. The movement of the rack 101 is transmitted to the wire 107 only when the arm 104 engages with either stopper 108a or 108b.

In a neutral state of steering wheel 102 (i.e., while the vehicle is running straight), the arm 104 is located midway between the stoppers 108a and 108b, providing a play of length l between the arm and each of the stoppers 108a and 108b. Therefore, while the displacement h of rack 101 is less than the play noted above (i.e., l>h), it is not transmitted to wire 107, but when it exceeds the play (l<h), it is transmitted to the wire 107.

The other end of the wire 107 is coupled to one end (i.e., left end in FIG. 6) of an input rod 110 of a rear wheel steering mechanism 109. A pair of stopper rings 111 are provided in a spaced-apart relation to each other on an intermediate portion of the input rod 110. Opposed sides of the stopper rings 111 support inner peripheries of a pair of spring retainer rings 112, between which a compression spring 113 is provided. Respective outer peripheries of the spring retainer rings 112 face inner flanges 115 of a casing 114 formed at opposite ends. The casing 114 is mounted on a substrate for supporting the rear wheel steering mechanism 109. The input rod 110 thus is held at its neutral position as illustrated unless external force is exerted (i.e., unless the wire 107 is pushed or pulled).

The output rod 116 constitutes together with the input rod 110 the rear wheel steering mechanism 109. It can be displaced in the axial direction (i.e., to the left and right directions in FIG. 6) to steer the rear wheels. The input and the output rods 110 and 116 extend substantially parallel to each other. However, if necessary, either one of these rods (i.e., either rod 110 or 116) is slightly pivotably supported on a vehicle body so that it is capable of displacement relative to the first coupling rod 117 to be described later. Neither rod 110 nor 116 need be supported on the vehicle body if the first coupling rod 117 has sufficient rigidity and it is also capable of slightly telescoping or if pivotal sections a and b each between respective end of the first coupling rod 117 and one of the rods 110 and 116 are made capable, by engagement between holes 118 and rollers 119, of slight displacement in the axial direction of the first coupling rod 117.

A second coupling rod 121 has its intermediate portion coupled through a pivotal member 120 to an intermediate portion of the first coupling rod 117 which has its opposite ends pivotably coupled to the input and output rods 110 and 116 as noted above. The second coupling rod 121 has one end pivotably coupled to one end (i.e., left end in FIG. 6) of a displacement rod 122 capable of axial displacement (i.e., to the left and right directions in FIG. 6).

The displacement rod 122 has an extension rod 123 projecting from the other end. Spring-retaining rings 124 are fitted on a stem portion and a free end portion of the extension rod 123 such that respective outer peripheries thereof face inner flanges 126 of a casing 125 supported on a substrate on which the rear wheel steering mechanism 109 is mounted. The inner flanges 126 are formed on opposite open ends of the casing 125. A compression spring 127 is provided between the spring-retaining rings 124 to hold the displacement rod 122 at a neutral position thereof shown in FIG. 6 unless any external force is exerted.

The neutral position of the displacement rod 122 is detected by contact between a first contact piece 128 provided on an intermediate portion of the displacement rod 122 and a projection 129 provided on one side of the rod 122. The extent and direction of displacement of the displacement rod 122 are detected by frictional contact between a second contact piece 130 provided on an intermediate portion of the displacement rod 122 and a resistor 131 disposed sidewise of the rod 122. Signals from a displacement sensor which is constituted by the first and the second contact pieces 128 and 130 is supplied to a controller 132 to permit measurement of the displacement of the displacement rod 122 and also provide for a fail-safe function.

Spring-retaining rings 133 and a compression spring 134 are provided on the intermediate portion of the output rod 116 like the rings 124 and the spring 134 with outer peripheries of the spring-retaining rings 133 facing flanges 135 formed on the inner periphery of a casing 148 supported on a substrate adjacent to opposite open ends of the casing 148. Thus, in the absence of external force applied to it, the output rod 116 is held at its neutral position, and no steering angle is given to the rear wheels.

A ball bearing screw mechanism 136 is provided at one end (i.e., left end in FIG. 6) of the output rod 116. It includes the nut 137, which may be turned to cause an axial displacement of the output rod 116.

A driven gear 138 is secured to the nut 137, and it is in mesh with a drive gear 140 secured to the output shaft of a reversible electric motor 139. The amount and direction of axial displacement of the output rod 116 are controlled by controlling current supply to the electric motor 139.

The second coupling rod 121 which is pivotally coupled at one end to one end of the displacement rod 122 and having an intermediate portion coupled via the pivotal member 120 to an intermediate portion of the first coupling rod 117, is capable, if necessary, of slightly telescoping for the same reasons as in the case of the first coupling rod 117. A nut 141 is pivoted to the other end of the second coupling rod 121. Screwed in the nut 141 is a male thread 143 formed on the outer periphery of the output shaft of a stepping servo motor 142, which is mounted on a stationary part of the vehicle body. Thus, with the rotation of the stepping servo motor 142, the second coupling rod 121 is pivotable about the pivotal member 120 to cause axial displacement of the displacement rod 122.

The stepping servo motor 142 is rotated in a proper direction by a proper angle (number of rotations) according to a command signal from a controller 132.

The controller 132 includes a microcomputer, and for detecting the rotational angle and angular speed of the steering wheel 102, it receives, in addition to signals from the displacement sensor constituted by the first and second contact pieces 128 and 130, signals from two steering angle sensors 145a and 145b provided in the neighborhood of a handle shaft 144, a vehicle speed sensor 149 for detecting the vehicle speed and means 15 including various other sensors for detecting at least one of items selected from those having influence on the running of the vehicle, for instance the magnitude of reaction force generated in the front wheel steering unit, acceleration (G) applied sidewise to the vehicle body and stress applied thereto due to sidewise winds or running along a slope.

The controller 132 causes rotation of the stepping servo motor 142 in a proper direction and by a proper angle (i.e., number of rotations) independently of the driving of the electric motor 139 according to the running status of the vehicle determined from the signals supplied from the sensors noted above.

With the rotation of the stepping servo motor 142, the nut 141 meshing with the male thread 143 is axially displaced to cause moving about the pivotal member 120 of the second coupling rod 121 at one end to the nut 141. As a result, the second coupling rod 121 causes an axial displacement of the displacement rod 122.

The motion of the stepping servo motor 142 as above is detected by the rotational angle sensor 146, which directly detects the rotational angle of the stepping servo motor 142, and the displacement sensor 147, which detects the axial displacement of the nut 141. The signals from both sensors 146 and 147 are supplied to the controller 132.

The provision of two steering angle sensors 145a and 145b and also the provision of rotational angle and displacement sensors 146 and 147 for detecting the operation of the stepping servo motor 143 are made for providing a fail-safe function to ensure reliable control even if there is a trouble in either one of the two like sensors.

The function of the four-wheel steering apparatus having the construction as described according to the invention will now be described in connection with the steering of the vehicle.

First, a case is considered, in which the front and rear wheels are steered in an interlocked relation to one another such as in the case of steering the rear wheels in the opposite direction to the front wheels to reduce the turning radius of the vehicle during low speed running.

While the rotational angle of the steering wheel 102 is small, the arm 104 provided at the end of the rack 101 strikes neither stopper 108a nor 108b, and the wire 107 is neither pushed nor pulled. When the steering wheel 102 is rotated greatly to change the running direction of the vehicle so that the displacement of the rack 101 is increased, the arm 104 strikes either stopper 108a or 108b to push or pull the wire 107.

As a result, the input rod 110 of the rear wheel steering mechanism 109 is displaced an amount l less than the displacement of the rack 101.

With this displacement of the input rod 110 in the axial direction with operation of the steering wheel 102, a pivotal section a between the input rod 110 and one end of the first coupling rod 117 is displaced from a position $a_0$ to a position $a_1$ in FIG. 7, whereupon the first coupling rod 117 is caused to swing about a pivotal section b between it and the output rod 116. Thus, the first coupling rod 117, which has been in the state shown by solid line in FIG. 7, is displaced to the state as shown by dashed line. At this time, since the stepping servo motor 142 is not energized and a pivotal section e between the nut 141 and the second coupling rod 121 does not move, the pivotal member 120 connecting the intermediate portions of the first and the second coupling members 117 and 121 moves from a position $c_0$ to a position $c_1$ in FIG. 7.

As a result, a pivotal section d between the second coupling rod 121 and the displacement rod 122 is displaced from a position $d_0$ to a position $d_1$ in FIG. 7 to change a signal, which represents the position of the displacement rod 122 and is supplied from the displacement sensor constituted by the resistor 131 and the second contact piece 130 to the controller 132.

It is to be understood that at the moment of displacement of the displacement rod 122 the output rod 116 has not yet been moved, and the pivotal section b between the first coupling rod 117 and the output rod 116 is found at the position $b_0$ in FIG. 7. Immediately afterwards, however, the controller 132 rotates the electric motor 139 in a proper direction and to a proper extent according to a signal representing the position of the displacement rod 122, thus causing an axial displacement of the output rod 116 through the ball screw mechanism 136 by cooperation of the drive gear 140, the driven gear 138 and the nut 137. In this way, the rear wheels are steered.

Upon displacement of the output rod 116, the pivotal section b between the first coupling rod 117 and the output rod 116 is displaced from the position $b_0$ to the position $b_1$ in FIG. 7. When, the first coupling rod 117 comes to the state shown by a phantom line, the pivotal section 120 coupling together the intermediate portions of the first and the second coupling rods 117 and 121 is displaced or returned from the position $c_1$ to the position $c_0$. In other words, the displacement of the pivotal member 120, which couples together the intermediate position of the first coupling rod 170 and intermediate portion of the second coupling rod 121 having one end pivotably coupled to the displacement rod 122 return to zero.

This displacement correction, i.e., the operation of movement of the pivotal member 120 from the position $c_0$ to the position $c_1$ and then back to the position $c_0$ is effected momentarily with axial displacement of the input and the output rods 110 and 116. Therefore, the displacement of the input rod 110 is effectively transmitted directly to the output rod 116 as if the first coupling rod 117 were rotated about the pivotal member 120 fixed at the position $c_0$ from the state shown by the solid line in FIG. 7 to the state shown by the phantom line, and the rear wheels are steered in accordance with the steering of the front wheels.

Accordingly, a sufficiently large angle can be given to the rear wheels even if safety is taken into consideration, thus permitting the turning radius of the vehicle to be sufficiently reduced. Further, since this embodiment utilizes the Bowden cable 106 as a mechanical coupling mechanism for transmitting a change in orientation of the front wheels to the rear wheels, the mechanism for mechanically coupling the rack 1 for steering the front wheels and the input rod 110 of the rear wheel steering mechanism 109 can be disposed substantially freely, thus increasing the degree of freedom of design. The Bowden cable 106 transmits only displacement data between the rack 101 and the input rod 110 and never transmits steering force. Therefore, it need not have particularly high rigidity.

Now, a case of steering the rear wheels independently of the front wheels will be considered. In this case, controller 132 supplies a signal to the stepping servo motor 142 according to signals from sensors (not shown) for detecting the vehicle state and also steering state signals from the steering angle sensors 145a and 145b. As a result, the stepping servo motor 142 causes displacement of the pivotal section e between the nut 141 and one end of the second coupling rod 121 from the position $e_0$ to the position $e_1$ in FIG. 8 via the male thread 143 and the nut 141. At this time, the second coupling rod 121 is rotated about the pivotal member 120 from the state shown by the solid line in FIG. 8 to the state shown by the dashed line, thus causing displacement of the pivotal section d between the other end of the second coupling rod 121 and the displacement rod 122 from the position $d_2$ to the position $d_3$. Thus, displacement rod 122 is displaced in a proper direction by a proper distance according to the direction and magnitude of external disturbance detected by sensors.

The displacement of the displacement rod 122 changes a signal, which represents the position of the displacement rod 122 and is supplied from the displacement sensor constituted by the resistor 131 and the second contact piece 130 to the controller 132. According to this signal, the controller 132 rotates the electric motor 139 in a proper direction and by a proper amount, thus causing an axial displacement of the output rod 116 through the ball bearing screw mechanism 136 by cooperation the drive gear 140, the driven gear 138 and the nut 137.

As a result, the pivotal section b between the output rod 116 and the first coupling rod 117, which has been at position $b_2$ in FIG. 8, is displaced to the position $b_3$, thus permitting subsequent steering of the rear wheels irrespective of any displacement of the input rod 110 and hence independently of the front wheels.

When the output rod 116 is axially displaced to an amount necessary and sufficient for appropriate steering of the rear wheels, the pivotal member 120, by which the intermediate portions of the first and the second coupling rods 117 and 121 are coupled together, is displaced from the position $c_2$ to the position $c_3$ in FIG. 8, and the second coupling rod 121 is rotated about the position el from the position shown by dashed line to the position shown by phantom line to displace or return the pivotal section d between the other end of the second coupling rod 121 and the displacement rod 122 from the position $d_3$ to the position $d_2$.

Thus, the displacement rod 122 assumes a neutral position as shown in FIG. 6. The controller 132 thus stops the electric motor 139 to discontinue the displacement of the output rod 116, thus setting or fixing the steering angle of the rear wheels. When the external disturbance is over, the steering angle of the rear wheels is reduced to zero by the converse sequence of operations to that described above. During this time, the pivotal section a between the input rod 110 and the first coupling rod 117 remains stationary (unless the steering wheel 102 is rotated).

Because the displacement rod 122 is displaced to a small amount by the stepping servo motor 142, there is no possibility of a large steering angle to the rear wheels irrespective of the motion of steering wheel even if a trouble occurs.

As has been described in the foregoing, with the four-wheel steering apparatus according to the invention the steering angle of the rear wheels is increased in an interlocked relation to the steering of the front wheels while it is reduced independently of the steering of the front wheels. Thus, while it is possible to reduce the turning radius of the vehicle under an ensured safety condition, in case when an unexpected occurrence is encountered during high speed driving the rear wheels can be steered subtly to ensure safety of the vehicle.

What is claimed is:

1. A four-wheel steering apparatus comprising a front wheel steering member for steering front wheels by being displaced according to a movement of a steering wheel, a rear wheel steering mechanism for steering rear wheels, a play mechanism, and a coupling mechanism mechanically coupling together said front wheel steering member and an input member of said rear wheel steering mechanism through said play mechanism for transmitting displacement of said front wheel steering member to said input member of said rear wheel steering mechanism by way of said play mechanism, said play mechanism transmitting displacement of said front wheel steering member only when said front wheel steering member is displaced in excess of a predetermined amount from a position corresponding to a neutral steering angle of the front wheels, said rear wheel steering mechanism including a mechanism for steering the rear wheels according to a movement of said input member and an independent steering mechanism for steering the rear wheel independently of displacement of said front wheel steering member.

2. The four-wheel steering apparatus according to claim 1, wherein said coupling mechanism is a Bowden cable.

3. The four-wheel steering apparatus according to claim 1, wherein said rear wheel steering mechanism includes an axially movable input rod constituting said input member, an output rod for steering the rear wheels by being axially displaced, first coupling rod means having opposite ends pivotably coupled to said input and output rods, respectively, a hydraulic change-over valve including a cylinder and a spool provided therein for switching communication of operating fluid supply and discharge ports of said valve with first and second control ports of said valve by axial displacement of said spool, second coupling rod means having opposite ends one of which is coupled to said spool, a pivotal member pivotably coupling together intermediate portions of said first and second coupling rod means, a hydraulic cylinder supporting said output rod and including a piston secured to an outer periphery of an intermediate portion of said output rod and fitted fluid-tight in said hydraulic cylinder for axial movement relative thereto, first and second operating fluid paths communicating first and second chambers formed in said hydraulic cylinder on opposite sides of said piston with said first and second control ports of said hydraulic change-over valve, drive means coupled to the other said end of said second coupling rod means to cause axial displacement of the spool of said hydraulic change-over valve through said second coupling rod means, and a controller for controlling said drive means according to a running state of a vehicle as detected by sensor means.

4. The four-wheel steering apparatus according to claim 2, wherein said rear wheel steering mechanism includes an axially movable input rod constituting said input member, an output rod for steering the rear wheels by being axially displaced, first coupling rod means having opposite ends pivotally connected to said input and output rods, respectively, a hydraulic change-over valve including a cylinder and a spool provided therein for switching communication of operating fluid supply and discharge ports of said valve with first and second control ports of said valve by axial displacement of said spool, second coupling rod means having opposite ends one of which is coupled to said spool, a pivotal member pivotably coupling together intermediate portions of said first and second coupling rod means, a hydraulic cylinder supporting said output rod and including a piston secured to an outer periphery of an intermediate portion of said output rod and fitted fluid-tight in said hydraulic cylinder for axial movement relative thereto, first and second operating fluid paths communicating first and second chambers formed in said hydraulic cylinder on opposite sides of said piston with said first and second control ports of said hydraulic change-over valve, drive means coupled to the other said end of said second coupling rod means to cause axial displacement of the spool of said hydraulic change-over valve through said second coupling rod means, and a controller for controlling said drive means according to a running state of a vehicle as detected by sensor means.

5. The four-wheel steering apparatus according to claim 3, wherein said sensor means detects one or more parameters selected from rotational angle of a steering wheel, angular speed thereof, magnitude of the reaction generated in a front wheel steering unit, acceleration applied sidewise to the vehicle and stress applied thereto.

6. The four-wheel steering apparatus according to claim 4, wherein said sensor means detects one or more parameters selected from rotational angle of a steering wheel, angular speed thereof, magnitude of the reaction generated in a front wheel steering unit, acceleration applied sidewise to the vehicle and stress applied thereto.

7. The four-wheel steering apparatus according to claim 3, wherein said drive means includes a servo motor, and a signal from a rotational angle sensor for detecting a rotational angle of said servo motor and a signal from a displacement sensor for measuring displacement of a portion displaceable by an output shaft of said servo motor are supplied to a controller to provide a fail-safe function.

8. The four-wheel steering apparatus according to claim 5, wherein said drive means includes a servo motor, and a signal from a rotational angle sensor for detecting a rotational angle of said servo motor and a signal from a displacement sensor for measuring displacement of a portion displaceable by an output shaft of said servo motor are supplied to a controller to provide a fail-safe function.

9. The four-wheel steering apparatus according to claim 6, wherein said drive means includes a servo motor, and a signal from a rotational angle sensor for detecting a rotational angle of said servo motor and a signal from a displacement sensor for measuring displacement of a portion displaceable by an output shaft of said servo motor are supplied to a controller to provide a fail-safe function.

10. The four-wheel steering apparatus according to claim 3, wherein two steering angle sensors are provided on a portion rotatable with operation of a steering wheel, signals of said steering angle sensors being supplied to a controller to provide a fail-safe function.

11. The four-wheel steering apparatus according to claim 4, wherein two steering angle sensors are provided on a portion rotatable with operation of a steering wheel, signals of said steering angle sensors being supplied to a controller to provide a fail-safe function.

12. The four-wheel steering apparatus according to claim 5, wherein two steering angle sensors are provided on a portion rotatable with operation of a steering wheel, signals of said steering angle sensors being supplied to a controller to provide a fail-safe function.

13. The four-wheel steering apparatus according to claim 6, wherein two steering angle sensors are provided on a portion rotatable with operation of a steering wheel, signals of said steering angle sensors being supplied to a controller to provide a fail-safe function.

14. The four-wheel steering apparatus according to claim 7, wherein two steering angle sensors are provided on a portion rotatable with operation of a steering wheel, signals of said steering angle sensors being supplied to a controller to provide a fail-safe function.

15. The four-wheel steering apparatus according to claim 8, wherein two steering angle sensors are provided on a portion rotatable with operation of a steering wheel, signals of said steering angle sensors being supplied to a controller to provide a fail-safe function.

16. The four-wheel steering apparatus according to claim 9, wherein two steering angle sensors are provided on a portion rotatable with operation of a steering wheel, signals of said steering angle sensors being supplied to a controller to provide a fail-safe function.

17. The four-wheel steering apparatus according to claim 1, wherein said rear wheel steering mechanism includes an input rod constituting said input member, an output rod for steering the rear wheels by being axially displaced, first coupling rod means having opposite ends pivotably coupled to said input and output rods, respectively, a displacement rod, an axial displacement of which is detected by a displacement sensor, second coupling rod means having opposite ends one of which is coupled to said displacement rod, a pivotal member pivotably coupling together intermediate portions of said first and second coupling rod means, an electric motor for causing an axial displacement of said output rod, drive means coupled to the other said end of said second coupling rod means for causing axial displacement of said displacement rod through said second coupling rod means, and a controller for controlling current supply to said electric motor according to a signal from said displacement sensor and also according to a running state of a vehicle as detected by at least one separate sensor.

18. The four-wheel steering apparatus according to claim 17, wherein said displacement rod is pivotably coupled to said one end of said second coupling rod means and biased toward a neutral position, and said displacement sensor for detecting displacement of said displacement rod includes two sensors, one of which is an of-off sensor capable of being turned "on" only when said displacement rod is in said neutral position, thus providing a fail-safe function.

19. A four-wheel steering apparatus comprising a front wheel steering member displaceable in response to movement of a steering wheel for steering front wheels, a rear wheel steering mechanism for steering rear wheel, a play mechanism, and a coupling mechanism mechanically coupling said front wheel steering member and an input member of said rear wheel steering mechanism through said play mechanism for transmitting displacement of said front wheel steering member to said input member of said rear wheel steering mechanism by way of said play mechanism, said play mechanism transmitting only displacement of said front wheel steering member in excess of a predetermined amount from a neutral position of said front wheel steering member, said rear wheel steering mechanism including a first mechanism for steering the rear wheels in accordance with displacement of said input member and a second mechanism for steering the rear wheels independently of displacement of said front wheel steering member.

20. The four-wheel steering apparatus according to claim 19, wherein said coupling mechanism includes a Bowden cable.

21. The four-wheel steering apparatus according to claim 20, wherein said play mechanism is connected at one end of said Bowden cable.

22. The four-wheel steering apparatus according to claim 19, wherein said first and second mechanisms collectively include an axially displaceable input rod constituting said input member, an axially displaceable output rod for imparting a steering angle to the rear wheels, first coupling rod means having opposite ends connected respectively to said input rod and said output rod, second coupling rod means having opposite ends connected respectively to a displacement member and a drive means for displacing said second coupling rod means, means pivotably coupling intermediate portions of said first and second coupling rod means such that said displacement member may be displaced in response to displacement of said first coupling rod means by said input rod and in response to displacement of said second coupling rod means by said drive means, means for controlling said drive means according to a running state of a vehicle, and means for displacing said output rod in response to displacement of said displacement sensor.

23. The four-wheel steering apparatus according to claim 22, wherein said displacement member comprises a spool of a hydraulic change-over valve.

24. The four-wheel steering apparatus according to claim 23, wherein said means for displacing said output rod comprises hydraulic cylinder-piston means supporting said output rod for displacement under control of said change-over valve.

25. The four-wheel steering apparatus according to claim 22, wherein said means for displacing said output rod comprises an electric motor drivingly connected to said output rod, and control means for controlling said motor in accordance with displacement of said displacement member.

26. The four-wheel steering apparatus according to claim 22, wherein the connections at said opposite ends of said first coupling rod means and said second coupling rod means are pivotable connections.

27. The four-wheel steering apparatus according to claim 22, wherein said coupling mechanism includes a Bowden cable.

28. The four-wheel steering apparatus according to claim 22, wherein said controlling means includes sensor means for detecting at least one parameter selected from the group consisting of rotational angle of a steering wheel, angular speed thereof, magnitude of the reaction generated in a front wheel steering unit, acceleration applied sidewise to the vehicle and stress applied thereto.

29. The four-wheel steering apparatus according to claim 22, wherein said drive means includes a servo motor and said controlling means includes means for sensing a rotational angle of said servo motor and for measuring displacement of a portion displaceable by an output shaft of said servo motor to provide a fail-safe function.

30. The four-wheel steering apparatus according to claim 22, wherein said controlling means includes two steering angle sensors provides on a portion rotatable with operation of a steering wheel to provide a fail-safe function.

* * * * *